United States Patent
Rusignola et al.

(10) Patent No.: US 11,162,798 B2
(45) Date of Patent: Nov. 2, 2021

(54) MAP UPDATES BASED ON DATA CAPTURED BY AN AUTONOMOUS VEHICLE

(71) Applicant: GM Cruise Holdings LLC, San Francisco, CA (US)

(72) Inventors: Michael Rusignola, Burlingame, CA (US); Brian Donohue, San Francisco, CA (US); Alexander Sennikov, San Francisco, CA (US); Irfan Lone, San Francisco, CA (US); Steve Xie, San Francisco, CA (US); Juan Fasola, San Francisco, CA (US)

(73) Assignee: GM Cruise Holdings, LLC, San Francisco, CA (US)

(*) Notice: Subject to any disclaimer, the term of this patent is extended or adjusted under 35 U.S.C. 154(b) by 280 days.

(21) Appl. No.: 16/410,402

(22) Filed: May 13, 2019

(65) Prior Publication Data
US 2020/0363215 A1    Nov. 19, 2020

(51) Int. Cl.
G01C 21/32    (2006.01)
G01S 17/89    (2020.01)
G05D 1/00     (2006.01)
G05D 1/02     (2020.01)

(52) U.S. Cl.
CPC ............. *G01C 21/32* (2013.01); *G01S 17/89* (2013.01); *G05D 1/0088* (2013.01); *G05D 1/0212* (2013.01); *G05D 1/0231* (2013.01); *G05D 2201/0213* (2013.01)

(58) Field of Classification Search
CPC ....... G01C 21/32; G01S 17/89; G01S 17/931; G05D 1/0088; G05D 1/0212; G05D 1/0231; G06F 16/29
See application file for complete search history.

(56) References Cited

U.S. PATENT DOCUMENTS

| 2016/0161265 A1* | 6/2016 | Bagheri | G01C 21/32 701/450 |
| 2019/0019409 A1* | 1/2019 | Farr | G08G 1/0965 |
| 2019/0385360 A1* | 12/2019 | Yang | G01S 17/42 |

FOREIGN PATENT DOCUMENTS

WO    2018162646 A1    9/2018

OTHER PUBLICATIONS

International Search Report and Written Opinion for International Application No. PCT/US2019/068348, dated Apr. 6, 2020, 10 pages.

* cited by examiner

*Primary Examiner* — Marthe Y Marc-Coleman
(74) *Attorney, Agent, or Firm* — Polsinelli, PC (57) ABSTRACT

The present technology provides a system that can update aspects of an authoritative map portion stored on an autonomous vehicle using low-resolution data from the at least one sensor of the autonomous vehicle, and therefore avoids the need for dispatching the special purpose mapping vehicle for these updates. The captured low-resolution data can be compared with the high-resolution map portion to determine that the sensor data reflects a feature in a way that is inconsistent with how that feature is represented in the authoritative map portion. The sensor data can then be used to relabel the authoritative map portion.

20 Claims, 6 Drawing Sheets

MAP UPDATES BASED ON DATA CAPTURED BY AN AUTONOMOUS VEHICLE

TECHNICAL FIELD

The present technology pertains to updating a portion of a map database using data captured by an autonomous vehicle, and more specifically pertains to updating a portion of an authoritative map database having high-resolution data and semantic labels using low-resolution data obtained from an autonomous vehicle.

BACKGROUND

An autonomous vehicle is a motorized vehicle that can navigate without a human driver. An exemplary autonomous vehicle includes a plurality of sensor systems, such as, but not limited to, a camera sensor system, a LIDAR sensor system, a radar sensor system, amongst others, wherein the autonomous vehicle operates based upon sensor signals output by the sensor systems. Specifically, the sensor signals are provided to an internal computing system in communication with the plurality of sensor systems, wherein a processor executes instructions based upon the sensor signals to control a mechanical system of the autonomous vehicle, such as a vehicle propulsion system, a braking system, or a steering system.

The autonomous vehicle navigates using a combination of data captured by at least one sensor of the autonomous vehicle and an authoritative map stored on the autonomous vehicle. The authoritative map is commonly created using a special purpose mapping vehicle which captures data at a much higher resolution than the at least one sensor on the autonomous vehicle. However, the configuration of roads commonly changes due to construction or other factors. When this happens the authoritative map reflects inconsistencies as compared with current conditions, and the road portions where the inconsistencies exist become restricted areas for the autonomous vehicle until the authoritative map is updated.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Various examples of the present technology are discussed in detail below. While specific implementations are discussed, it should be understood that this is done for illustration purposes only. A person skilled in the relevant art will recognize that other components and configurations may be used without parting from the spirit and scope of the present technology. In some instances, well-known structures and devices are shown in block diagram form in order to facilitate describing one or more aspects. Further, it is to be understood that functionality that is described as being carried out by certain system components may be performed by more or fewer components than shown.

The disclosed technology addresses the need in the art for a technology that can quickly update an authoritative map stored on the autonomous vehicle that reflects inconsistencies as compared with current conditions without the need for a special purpose mapping vehicle.

An autonomous vehicle navigates using a combination of data captured by at least one sensor of the autonomous vehicle and an authoritative map stored on the autonomous vehicle. The authoritative map is commonly created using a special purpose mapping vehicle which captures data at a much higher resolution than the at least one sensor on the autonomous vehicle. However, the configuration of roads commonly changes due to construction or other factors. When this happens the authoritative map reflects inconsistencies as compared with current conditions, and the road portions where the inconsistencies exist become restricted areas for the autonomous vehicle until the authoritative map is updated. Unfortunately, since updating the high-resolution map requires the special purpose mapping vehicle, a significant period can pass before the high-resolution map is updated.

The present technology provides a system that can update aspects of the authoritative map stored on the autonomous vehicle using low-resolution data from the at least one sensor of the autonomous vehicle, and therefore avoids the need for dispatching the special purpose mapping vehicle for these updates. This makes issuing map updates more efficient and significantly reduces the amount of time before a map update can be issued. The present technology also reduces the work load on the special purpose mapping vehicle because it is dispatched less often, and therefore, even when the map needs data from the special purpose mapping vehicle for an update, the time taken to update the map is shortened due to a reduction in the number of jobs queued for the special purpose mapping vehicle. Therefore, whether the special purpose mapping vehicle is needed or not, updates for map portions can be issued more quickly, and the periods in which areas are restricted to autonomous vehicles due to outdated maps are shortened.

Figure 1:
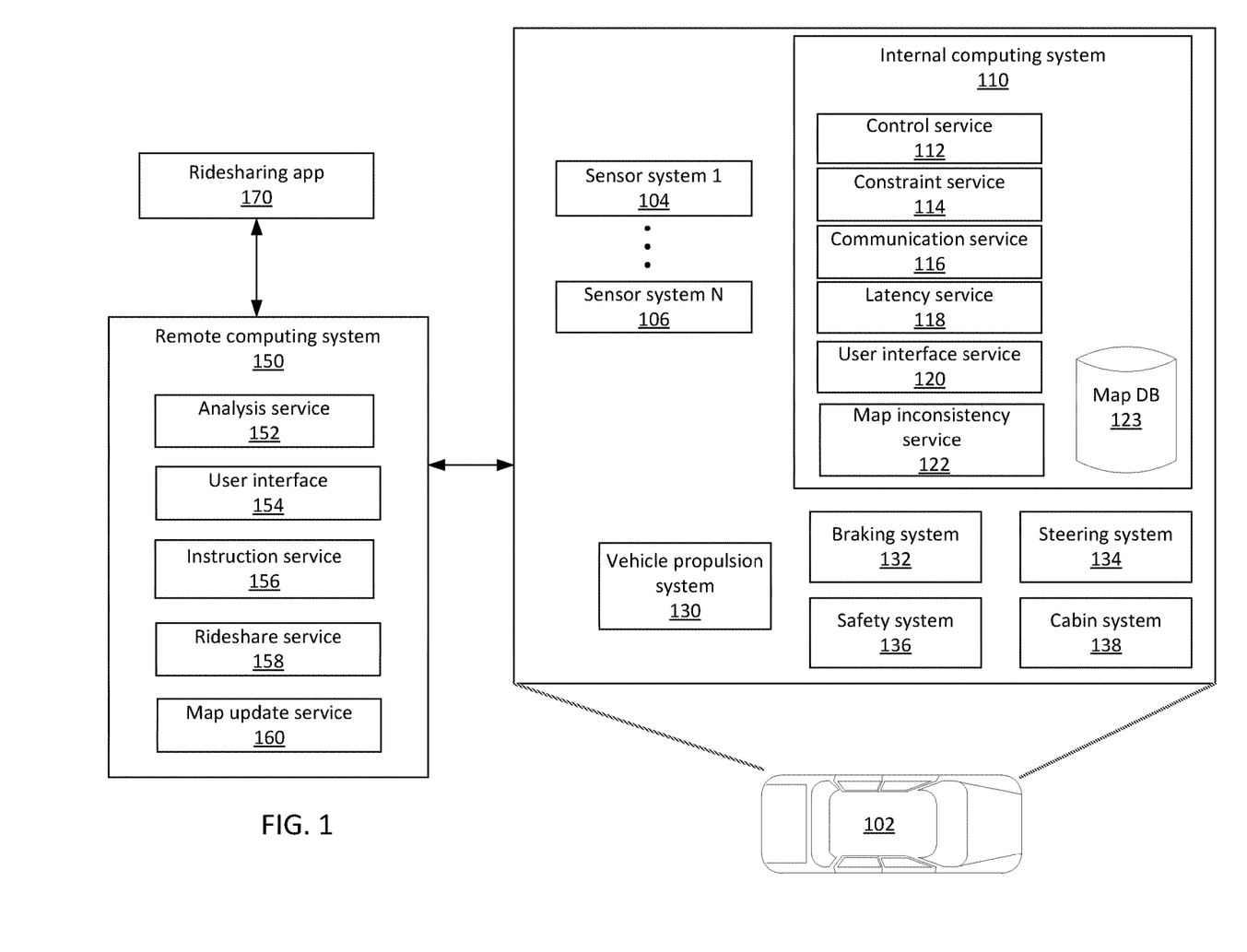
FIG. 1 shows an example system for piloting and management of an autonomous vehicle in accordance with some aspects of the present technology.

FIG. 1 illustrates environment 100 that includes an autonomous vehicle 102 in communication with a remote computing system 150.

The autonomous vehicle 102 can navigate about roadways without a human driver using sensor signals output by sensor systems 104-106 of the autonomous vehicle 102 and an authoritative map stored in map database 123. The autonomous vehicle 102 includes a plurality of sensor systems 104-106 (a first sensor system 104 through an Nth sensor system 106). The sensor systems 104-106 are of different types and are arranged about the autonomous vehicle 102. For example, the first sensor system 104 may be a camera sensor system and the Nth sensor system 106 may be a LIDAR sensor system. Other exemplary sensor systems include radar sensor systems, global positioning system (GPS) sensor systems, inertial measurement units (IMU), infrared sensor systems, laser sensor systems, sonar sensor systems, and the like.

The autonomous vehicle 102 further includes several mechanical systems that are used to effectuate appropriate motion of the autonomous vehicle 102. For instance, the mechanical systems can include but are not limited to, a vehicle propulsion system 130, a braking system 132, and a steering system 134. The vehicle propulsion system 130 may include an electric motor, an internal combustion engine, or both. The braking system 132 can include an engine brake, brake pads, actuators, and/or any other suitable componentry that is configured to assist in decelerating the autonomous vehicle 102. The steering system 134 includes suitable componentry that is configured to control the direction of movement of the autonomous vehicle 102 during navigation.

The autonomous vehicle 102 further includes a safety system 136 that can include various lights and signal indicators, parking brake, airbags, etc. The autonomous vehicle 102 further includes a cabin system 138 that can include cabin temperature control systems, in-cabin entertainment systems, etc.

The autonomous vehicle 102 additionally comprises an internal computing system 110 that is in communication with the sensor systems 104-106 and the systems 130, 132, 134, 136, and 138. The internal computing system includes at least one processor and at least one memory having computer-executable instructions that are executed by the processor. The computer-executable instructions can make up one or more services responsible for controlling the autonomous vehicle 102, communicating with remote computing system 150, receiving inputs from passengers or human co-pilots, logging metrics regarding data collected by sensor systems 104-106 and human co-pilots, etc.

The internal computing system 110 can include a control service 112 that is configured to control operation of the vehicle propulsion system 130, the braking system 132, the steering system 134, the safety system 136, and the cabin system 138. The control service 112 receives sensor signals from the sensor systems 104-106 as well communicates with other services of the internal computing system 110 to effectuate operation of the autonomous vehicle 102. In some embodiments, control service 112 may carry out operations in concert one or more other systems of autonomous vehicle 102.

The internal computing system 110 can also include a constraint service 114 to facilitate safe propulsion of the autonomous vehicle 102. The constraint service 114 includes instructions for activating a constraint based on a rule-based restriction upon operation of the autonomous vehicle 102. For example, the constraint may be a restriction upon navigation that is activated in accordance with protocols configured to avoid occupying the same space as other objects, abide by traffic laws, circumvent avoidance areas, etc. In some embodiments, the constraint service can be part of the control service 112.

The internal computing system 110 can also include a communication service 116. The communication service can include both software and hardware elements for transmitting and receiving signals from/to the remote computing system 150. The communication service 116 is configured to transmit information wirelessly over a network, for example, through an antenna array that provides personal cellular (long-term evolution (LTE), 3G, 5G, etc.) communication.

In some embodiments, one or more services of the internal computing system 110 are configured to send and receive communications to remote computing system 150 for such reasons as reporting data for training and evaluating machine learning algorithms, requesting assistance from remoting computing system or a human operator via remote computing system 150, software service updates, map updates, ridesharing pickup and drop off instructions etc.

The internal computing system 110 can also include a latency service 118. The latency service 118 can utilize timestamps on communications to and from the remote computing system 150 to determine if a communication has been received from the remote computing system 150 in time to be useful. For example, when a service of the internal computing system 110 requests feedback from remote computing system 150 on a time-sensitive process, the latency service 118 can determine if a response was timely received from remote computing system 150 as information can quickly become too stale to be actionable. When the latency service 118 determines that a response has not been received within a threshold, the latency service 118 can enable other systems of autonomous vehicle 102 or a passenger to make necessary decisions or to provide the needed feedback.

The internal computing system 110 can also include a user interface service 120 that can communicate with cabin system 138 in order to provide information or receive information to a human co-pilot or human passenger. In some embodiments, a human co-pilot or human passenger may be required to evaluate and override a constraint from constraint service 114, or the human co-pilot or human passenger may wish to provide an instruction to the autonomous vehicle 102 regarding destinations, requested routes, or other requested operations.

The map inconsistency service 122 can compare data collected by sensors 104-106 to the authoritative map stored in map database 123. The configuration of roads commonly changes due to construction or other factors. When this happens the map inconsistency service 122 determines that the authoritative map stored in map database 123 reflects inconsistencies as compared with current conditions, and the road portions where the inconsistencies exist become restricted areas for the autonomous vehicle until the authoritative map is updated. The map inconsistency service 122 can communicate with map update service 160 via the communication service 116 to receive updated portions of the authoritative map.

As described above, the remote computing system 150 is configured to send/receive a signal from the autonomous vehicle 102 regarding reporting data for training and evaluating machine learning algorithms, requesting assistance from remote computing system 150 or a human operator via the remote computing system 150, software service updates, map updates, rideshare pickup and drop off instructions, etc.

The remote computing system 150 includes an analysis service 152 that is configured to receive data from autonomous vehicle 102 and analyze the data to train or evaluate machine learning algorithms for operating the autonomous vehicle 102. The analysis service 152 can also perform analysis pertaining to data associated with one or more errors or constraints reported by autonomous vehicle 102.

The remote computing system 150 can also include a user interface service 154 configured to present metrics, video, pictures, sounds reported from the autonomous vehicle 102 to an operator of remote computing system 150. User interface service 154 can further receive input instructions from an operator that can be sent to the autonomous vehicle 102.

The remote computing system 150 can also include an instruction service 156 for sending instructions regarding the operation of the autonomous vehicle 102. For example, in response to an output of the analysis service 152 or user interface service 154, instructions service 156 can prepare instructions to one or more services of the autonomous vehicle 102 or a co-pilot or passenger of the autonomous vehicle 102.

The remote computing system 150 can also include a rideshare service 158 configured to interact with ridesharing applications 170 operating on (potential) passenger computing devices. The rideshare service 158 can receive requests to be picked up or dropped off from passenger ridesharing app 170 and can dispatch autonomous vehicle 102 for the trip. The rideshare service 158 can also act as an intermediary between the ridesharing app 170 and the autonomous vehicle wherein a passenger might provide instructions to the autonomous vehicle 102 to go around an obstacle, change routes, honk the horn, etc.

As introduced above, the present technology provides a system that can update aspects of the authoritative map stored on the autonomous vehicle 102 map database 123 using low-resolution data from the at least one sensor 104-106 of the autonomous vehicle 102, and therefore avoids the need for dispatching the special purpose mapping vehicle for these updates. This makes issuing map updates more efficient and significantly reduces the amount of time before a map update can be issued.

The authoritative map includes a high density of points obtained from a high-resolution LIDAR system on a special purpose mapping vehicle, otherwise referred to as a high-resolution point map, and semantic labels that identify features represented in the high density of points obtained from the high-resolution LIDAR system. The semantic labels identify features such as lane lines, line colors, driveways, locations of stop signs and stoplights, crosswalks, etc. In one or more embodiments, the authoritative map further includes low-resolution point map data indicative of updates to the semantic labels as described herein.

In some embodiments the authoritative map stored on the autonomous vehicle 102 map database 123 is stored as a collection of map portions that contain map data for a particular geographic area. In some embodiments the map portions can include two-dimensional data or three-dimensional data.

In some embodiments, the present technology can use low-resolution data from the at least one sensor 104-106 of the autonomous vehicle 102 to relabel the semantic labels on top of the existing high density of points obtained from the high-resolution LIDAR system already represented in the stored authoritative map.

Figure 2:
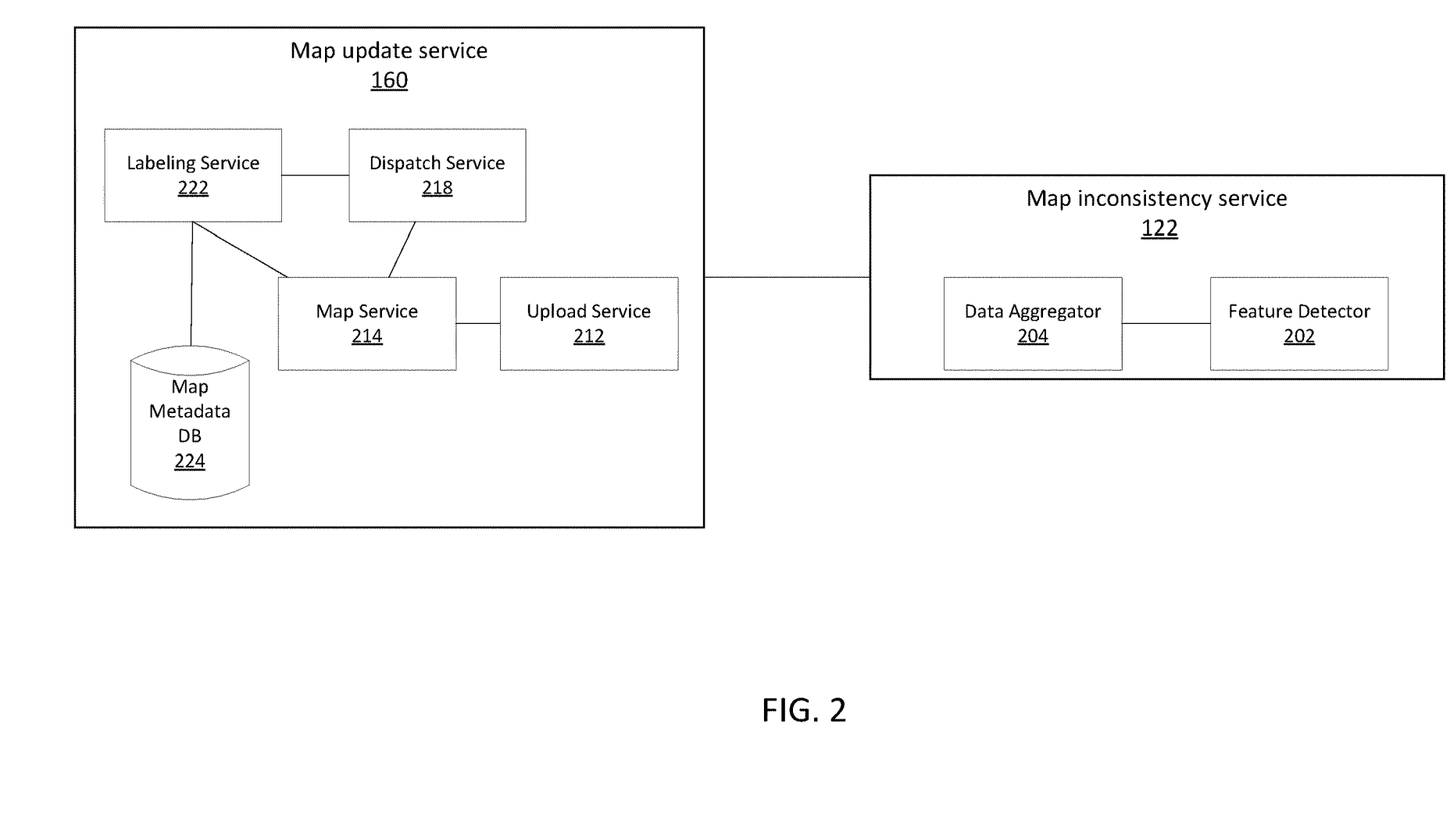
FIG. 2 shows an example system for updating a map portion to resolve inconsistencies between the map portion and sensor data in accordance with some aspects of the present technology.

FIG. 2 illustrates an example system embodiment showing the map update service 160 and the map inconsistency service 122 in greater detail. While the system illustrated in FIG. 2 is discussed with respect to the methods illustrated in FIG. 3 and FIG. 5, it should be appreciated that each of the figures represents their own separate embodiment and should not be limited by such cross-reference between the figures except as defined in the claims.

The map inconsistency service 122 functions to determine when features illustrated in the authoritative high definition map stored in map database 123 are inconsistent with features detected by sensors 104-106. While sensors 104-106 may capture data at a lower resolution than is reflected in the authoritative high definition map, the data captured by sensors 104-106 can be sufficient to determine such inconsistencies. Detecting these inconsistencies is important because the authoritative high definition map can become outdated and no longer reflect the configuration of the road. The data from sensors 104-106 reflect the current configuration of the road.

Figure 3:
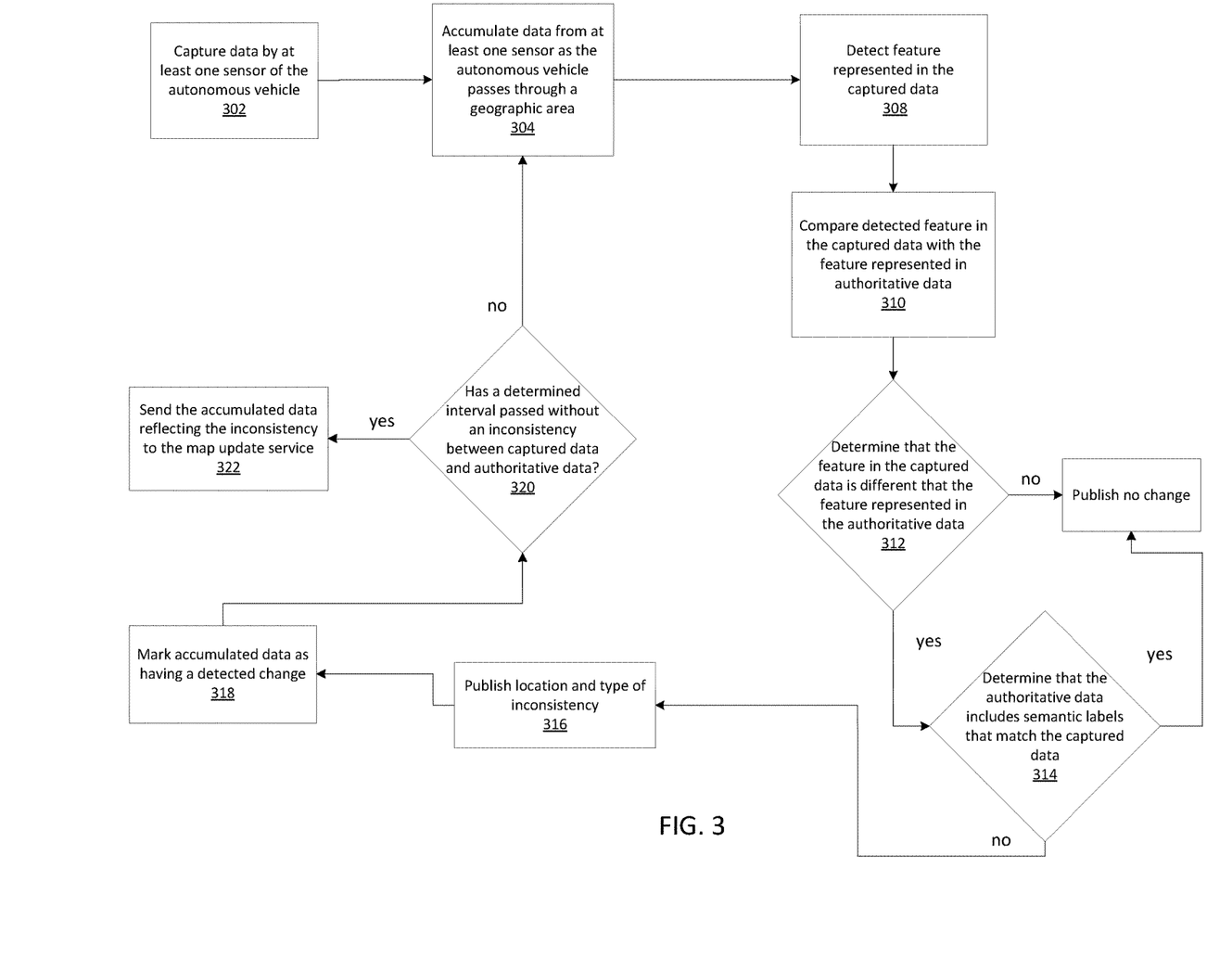
FIG. 3 shows an example method for updating a map portion to resolve inconsistencies between the map portion and sensor data in accordance with some aspects of the present technology.

FIG. 3 illustrates an example method by which map inconsistency service 122 can determine such inconsistencies. As the autonomous vehicle 102 navigates a route, sensors 104-106 capture (302) data reflecting the environment around the autonomous vehicle 102. The data aggregator 204 can accumulate data (304) from the at least one sensor 104-106 as the autonomous vehicle 102 passes through a geographic area. Even over a small distance, data aggregator 204 can accumulate data (304) from the same sensor as the sensor continuously collects data. For example, in the case of a LIDAR, the LIDAR continuously creates a point map from data collected from the environment around the autonomous vehicle 102, and this data is aggregated by data aggregator 204.

While data is being captured (302) by the at least one sensor 104-106 of the autonomous vehicle 102, the feature detector 202 can detect (308) features represented in the captured data, and can compare (310) the detected features in the captured data with features represented in the authoritative data, e.g. the authoritative map stored in map database 123.

In some instances, the feature detector 202 will determine (312) that the feature in the captured data is different than the feature represented in the authoritative data. For example the authoritative data may reflect a lane line at a particular location on a road whereas the captured data might reflect the lane line at a different location on the road. Other examples of inconsistencies might include the addition or removal of a lane line, the change in color of a lane line, the presence or absence of a crosswalk, the presence or absence of a stop sign or streetlight, the location of a stop sign or streetlight, etc.

When the feature detector 202 determines (312) that the feature in the captured data is different than the feature represented in the authoritative data, the feature detector 202 further needs to determine (314) that the authoritative data does not include any revised semantic labels that already reflect the features represented in the captured data. This step is used to prevent the map inconsistency service 122 from reporting any inconsistency that has already been accounted for. As will be described below, the updated authoritative map data portion continues to include a high definition point map previously captured by a mapping vehicle even though the high definition point map may reflect some outdated features. The outdated map portion is updated by way of updated semantic labels, which are updated on the basis of the lower resolution data captured by the at least one sensor 104-106 of the autonomous vehicle 102. Therefore when the autonomous vehicle 102 navigates to a location for which the map data has been updated using the present technology, the feature detector 202 might initially determine (312) that the feature in the captured data is different than the feature represented in the authoritative map data portion—at least as the feature is represented by the high-resolution point map. However if the map data portion has been updated using the present technology, the (updated) authoritative map data portion will include revised semantic labels which the autonomous vehicle can rely upon to navigate. The feature detector 202 will determine (314) that the authoritative data includes the revised semantic labels and will not need to publish any change.

If the feature detector 202 determines (314) that the authoritative data does not include semantic labels that reflect the features as represented in the captured data, the feature detector 202 can publish (316) the location and type of inconsistency detected. For example, if the feature detector 202 determines that a lane line is a present in a location other than where the lane line is reflected in the authoritative data then the feature detector 202 will identify the location where the lane line has been detected and identify a lane boundary change. The feature detector 202 can also classify the type of change. For example when the change is with respect to a lane boundary, the feature detector 202 can label the inconsistency as a lane line added to a new location, removed from an expected location or changed from how it is currently represented in the authoritative map data portion. For lane boundary changes, the feature detector 202 also includes line type (single, double), line style (solid, broken) and line color (white, yellow) of the lane boundary. For limit line changes, the feature detector 202 also includes a line style (solid, broken) and line color (white, yellow) of the limit line. For crosswalk changes, the feature detector 202 also includes crosswalk color (e.g., white, yellow, etc.). In addition, the feature detector 202 can identify the sensor type that detected the change.

The data aggregator 204 can mark (318) the accumulated data from the at least one sensor 104-106 as reflecting a detected change. The data aggregator 204 will wait until a determined interval has passed (320) without any inconsistency between the capture data and the authoritative map data portion being reported, and once the determined interval has passed (320), the data aggregator 204 can send (322) the accumulated data reflecting the inconsistency to the map update service 160. For example, the accumulated data includes a low-resolution point map reflecting the inconsistency. The accumulated data may also have any other sensor information from the autonomous vehicle 102, including camera data (e.g. to determine lane color or bounding boxes), kinematic data (e.g. to determine the presence of a speed bump), etc. that can assist and be incorporated into an update to the authoritative map.

In various embodiments, the data aggregator 204 sends (322) the accumulated data over-the-air (e.g., using a cellular communication network) before the autonomous vehicle 102 has had a chance to return to a charging station or operating base (e.g. mid-trip). The communication service 116 may prioritize certain communications between the autonomous vehicle 102 and the remote computing system 150, for example safety critical and mission critical communications, over the accumulated data based on bandwidth considerations. The communication service 116 may divide the accumulated data into a set of smaller portions and transmit the smaller portions as bandwidth becomes available. Alternatively, the communication service 116 may transmit the accumulated data via Wi-Fi or other communication channel after the autonomous vehicle returns to a charging station, operating base, or other suitable location with appropriate capacity.

If the determined interval has not passed (320), the data aggregator 204 continues to accumulate data (304).

In some embodiments, the authoritative data is stored as a collection of map portions. In such embodiments, the data aggregator 204 may also send the accumulated data reflecting the inconsistency to the map update service 160 when the data that the data aggregator 204 is receiving no longer applies to that map portion. The data aggregator 204 can continue to collect data reflecting the inconsistency with respect to a different map portion. In some embodiments, a map portion can be defined by a geographic boundary having location coordinates such as might be reflected on a tile of a physical map.

In some embodiments, the accumulated data is sent as soon as it is ready to be sent. In some embodiments, the accumulated data can be queued until a time in which the communications service 116 is not being used for a more critical or time dependent communication.

Figure 4:
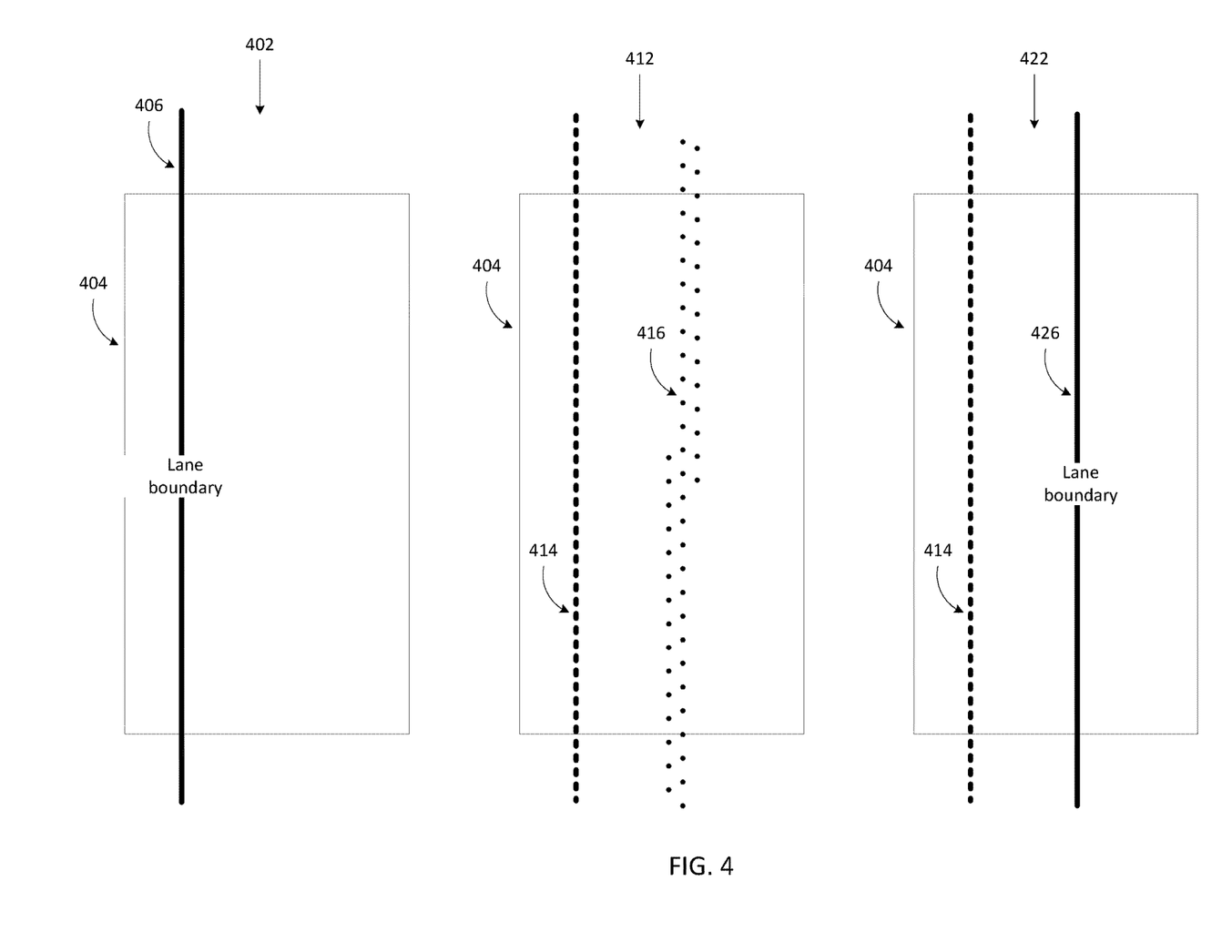
FIG. 4 shows an example visualization of a comparison between a map portion and sensor data in accordance with some aspects of the present technology.

FIG. 4 illustrates a graphical representation 402 of the authoritative data map portion prior to the determination (312) that the feature in the captured data is different than the feature represented in the authoritative data map portion, along with a representation 412 of an overlay of the high-resolution point map data with the low-resolution point map data captured by the at least one of the autonomous vehicle sensors superimposed thereon, and a representation 422 of the revised authoritative data.

On the left of FIG. 4 is the representation 402 of the authoritative data prior to the determination (312) that the feature in the captured data is different than the feature represented in the authoritative data. The authoritative data 402 shows a labeled lane boundary 406 running through a perimeter 404 representing a range of sensor detection surrounding the autonomous vehicle 102.

In the center of FIG. 4 is the representation 412 of overlay of the high-resolution point map data with the low-resolution point map data captured by the at least one sensor 104-106 of the autonomous vehicle 102. The more dense line 414 represents the high-resolution point map data obtained from the special purpose mapping vehicle. The more dense line 414 was the basis for the labeled lane boundary 406 in representation 402. The less dense lines 416 reflect the low-resolution point map data obtained from multiple readings from the at least one sensor 104-106 and represent the new location of the lane boundary. It is the comparison of the data represented as 416 and the data represented as 406 or 414 that the feature detector 202 compares to determine that the feature in the captured data (i.e., 416) is different than the feature represented in the authoritative data (i.e., 406 or 414).

On the right of FIG. 4 is the representation 422 of the revised authoritative data portion. The dense dashed line 414 still represents the high-resolution point map data obtained from the special purpose mapping vehicle, while the line 426 represents the updated and labeled lane boundary. Thus the updated authoritative data 422 continues to include the high-resolution point map data even if it might be out of date, but also includes the revised label (i.e. the lane boundary label 406 has been removed and has been replaced with the new lane boundary label 426 as the lane boundary was reflected in the captured data).

Figure 5:
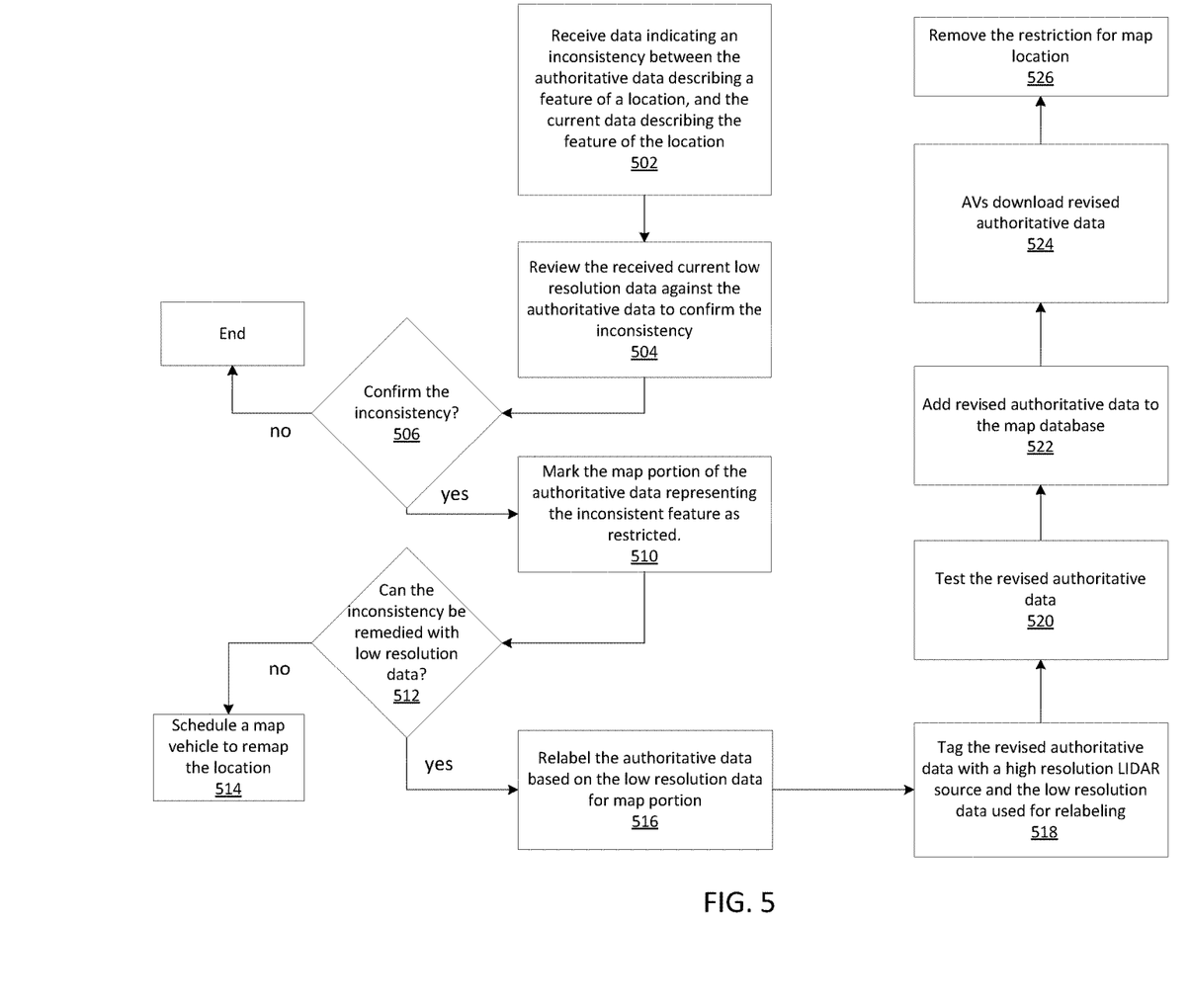
FIG. 5 shows an example method for updating a map portion to resolve inconsistencies between the map portion and sensor data in accordance with some aspects of the present technology.

FIG. 5 illustrates an example method for the process by which the map update service 160 updates the authoritative data to yield something like the updated authoritative data 422 shown in FIG. 4.

FIG. 5 begins when the upload service 212 receives data (502) from the map inconsistency service 122 indicating an inconsistency between the representation of the feature in the authoritative data map portion and the representation of the feature in the captured data describing the feature of the location. The upload service 212 can create a new revision task, and in some embodiments, the upload service 212 can identify the type of revision needed, such as a new "Lane Paint Change" (LPC) project. The upload service 212 can also upload the received data pertaining to the map portion to the map service 214. The map service 214 can indicate the data as low-resolution data, which prevents the captured data from being included directly into any updates to the authoritative data (but as described herein, the low-resolution data can be used to make labeling revisions which are included in the authoritative data).

The map service 214 manages versions of map portions and access to the map portions. Once a version of map portion has been brought under management of the map service 214, the map service stores and makes the version of the map portion accessible for review, and when appropriate, inclusion in the latest version of the authoritative map data for use by the autonomous vehicle 102. Only map data portions containing high-resolution data can be directly included in authoritative map data.

Once the data received (502) has been stored and put under management of map service 214 as a version of a map portion, the labeling service 222 can retrieve the version of the map portion that shows the inconsistency with the authoritative data map portion, and review (504) the low-resolution data against the current authoritative data map portion to confirm the existence of the inconsistency.

If the labeling service 222 confirms (506) the inconsistency, the labeling service 222 can cause the relevant map portion of the authoritative data to become marked as restricted (510) in the map service 214. When a map portion is marked as restricted by map service 214, this information can be published to the autonomous vehicle 102 and the autonomous vehicle can be prohibited from piloting itself within the area represented on the restricted map portion.

The labeling service 222 can further determine (512) whether the inconsistency can be remedied with the low-resolution data. If the inconsistency is of such a nature that new high-resolution data is required, the dispatch service 218 can schedule (514) a special purpose map vehicle to remap the location represented in the map portion. New high-resolution data can be required when details of the inconsistency are not sufficiently clear to relabel the authoritative map portion, or for data deemed critical for the piloting of the autonomous vehicle 102. An example of a critical inconsistency that might require new high-resolution data would include any change in the drivable area, as opposed to paint marking in the drivable area.

When the labeling service 222 determines (512) that the inconsistency can be remedied with the low-resolution data, the labeling service 222 analyzes the received low-resolution data and the authoritative data to relabel (516) the authoritative map data, which yields a revised authoritative map data portion. The labeling service 222 can be performed using heuristics to identify patterns that require relabeling, or can utilize machine learning algorithm to perform the relabeling. In some embodiments, a portion of the relabeling can be performed manually.

The labeling service 222 can associate (518) the revised map data portion with the sources of data used to create it, which includes the low-resolution data from the autonomous vehicle 102 sensor 104-106, and the high-resolution data from the previous version of the authoritative map portion which provides the high definition map points addressed above, and stores this information in the map metadata database 224. If new revisions are made to the revised map data portion, the labeling service 222 may save the updated low-resolution data from the autonomous vehicle 102 sensor 104-106, upon which the new revised map data portion was based, into the map metadata database 224. The plurality of low-resolution data may be versioned and appropriately associated with the corresponding revised map data portion.

The map service 214 can test (520) the revised authoritative map data portion by uploading the revised authoritative map data portion into a simulation service and stimulating the piloting performance of an autonomous vehicle. Assuming the simulation does not reveal any problems with the revised authoritative map data portion, the map service 214 can add (522) the revised authoritative map data portion to the map database.

Thereafter, the autonomous vehicle 102 can download (524) the revised authoritative data map portion and can remove (526) the restriction on the map location.

While the present technology has been described above in the context of authoritative map data for use by an autonomous vehicle, it will be appreciated by those of ordinary skill in the art that the present technology can be utilize to revise or update any reference data by using data collected by a sensor in the environment. The present technology is particularly useful when the reference data is of higher resolution or higher quality than might be collected by a sensor in the environment. Moreover, it is to be understood that the described steps may be performed in various orders. For example, the relevant map portion may be marked (510) as restricted before or after the inconsistency is confirmed (506), the determination of whether the inconsistency can be remedied with low resolution data (512), etc.

While the present technology has been described above with reference to a single autonomous vehicle, it will be appreciated by those of ordinary skill in the art that the autonomous vehicle can be one vehicle in a fleet of vehicles. Each vehicle can benefit from updates made to the authoritative map portion as a result of data collected by any other vehicle. In other words, all vehicles in the fleet of vehicles can have access to the most recent map data. Additionally, the present technology can also wait to update a map portion until a second vehicle in the fleet also flags a similar inconsistency as reported by a first vehicle. The data from the sensors of the first and second vehicle can be collectively used in the relabeling of the authoritative map portion.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Figure 6:
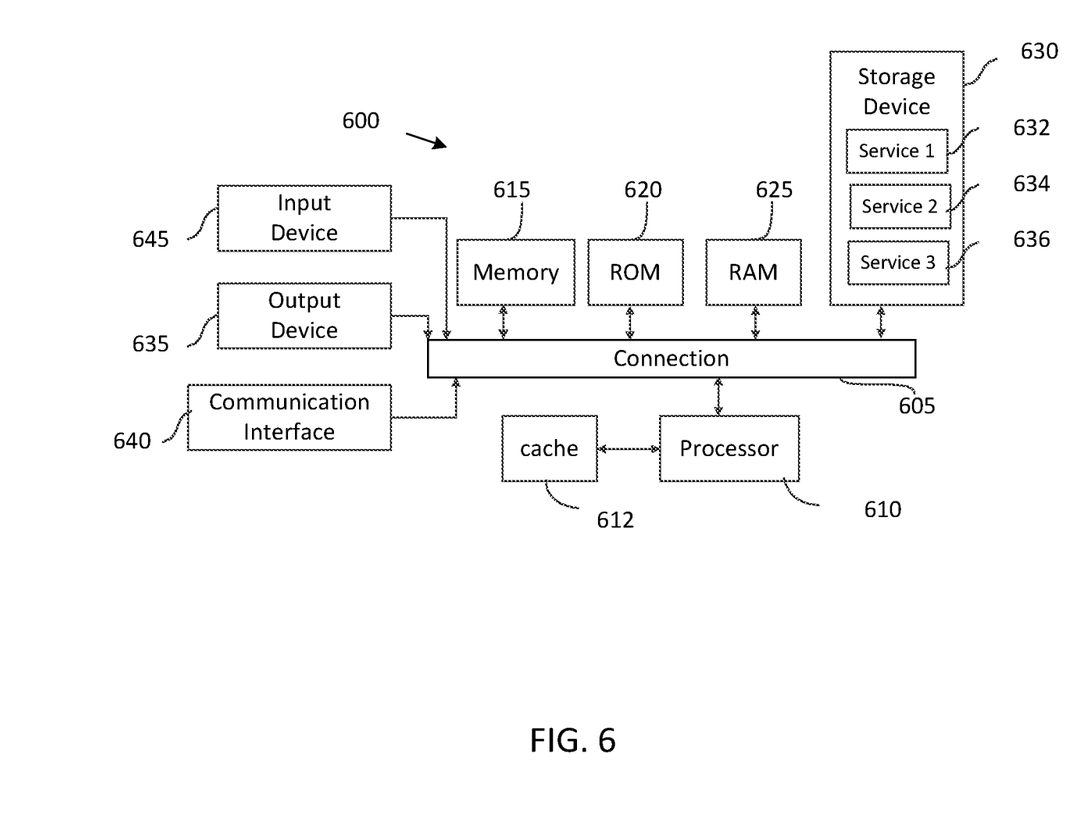
FIG. 6 shows an example of a system for implementing certain aspects of the present technology.

FIG. 6 shows an example of computing system 600, which can be for example any computing device making up internal computing system 110, remote computing system 150, (potential) passenger device executing rideshare app 170, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (CPU or processor) 610 and connection 605 that couples various system components including system memory 615, such as read-only memory (ROM) 620 and random access memory (RAM) 625 to processor 610. Computing system 600 can include a cache of high-speed memory 612 connected directly with, in close proximity to, or integrated as part of processor 610.

Processor 610 can include any general purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. There is no restriction on operating on any particular hardware arrangement, and therefore the basic features here may easily be substituted for improved hardware or firmware arrangements as they are developed.

Storage device 630 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 630 can include software services, servers, services, etc., that when the code that defines such software is executed by the processor 610, it causes the system to perform a function. In some embodiments, a hardware service that performs a particular function can include the software component stored in a computer-readable medium in connection with the necessary hardware components, such as processor 610, connection 605, output device 635, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
 receiving data indicating an inconsistency between stored data describing a feature of a location, and current data describing the feature of the location, wherein the stored data includes data from a high-resolution sensor system and semantic labels, wherein the current data is captured by at least one sensor of an autonomous vehicle, the at least one sensor on the autonomous vehicle captures the current data in a lower resolution than the high-resolution sensor system;

automatically checking for an availability of pre-existing updates to the semantic labels associated with the stored data based on the inconsistency;

generating revised data based on the current data if no pre-existing updates to the semantic labels are available; and publishing the revised data.

2. The method of claim 1, wherein the revised data includes the data from the high-resolution sensor system combined with revised semantic labels, the revised semantic labels having been generated based on the current data in the lower resolution.

3. The method of claim 2, wherein the data from the high-resolution sensor system is a high-resolution point cloud from a LIDAR system on a special purpose mapping vehicle, and the current data is a lower resolution point cloud from a LIDAR system on the autonomous vehicle.

4. The method of claim 2, further comprising:
storing the current data and associating it with an identifier; and
tagging the revised data with the identifier of the current data, whereby a source of the revised semantic labels is indicated by the identifier of the current data.

5. The method of claim 1, wherein the stored data and revised data pertains to a map portion defined by a boundary of location coordinates, wherein the stored data is an earlier version of the map portion, and the revised data is a later, revised version of the map portion.

6. The method of claim 5, comprising:
publishing a restriction on a use of the map portion upon the receipt of the data indicating the inconsistency between all stored data and the current data; and
removing the restriction on the use of the map portion after the revised data has been published.

7. A computing system comprising:
at least one non-transitory computer readable medium comprising instructions stored thereon, wherein the instructions are effective to cause the computing system to:
receive data indicating an inconsistency between a feature of a physical environment represented in a stored, authoritative data portion, and the feature represented in current data collected by at least one sensor located in the physical environment;
determine that the data collected by the at least one sensor located in the physical environment represents the feature of the physical environment in a manner that is inconsistent with the authoritative data portion;
automatically check for an availability of pre-existing updates to one or more semantic labels associated with the authoritative data portion;
revise the feature of the physical environment in the authoritative data portion to be consistent with the data collected by the at least one sensor located in the physical environment to yield a revised authoritative data portion if no pre-existing updates to the one or more semantic labels are available.

8. The computing system of claim 7 wherein the authoritative data portion includes data points in a high resolution, and the current data includes data points in a lower resolution.

9. The computing system of claim 8, wherein the revised authoritative data portion includes the data points in the high resolution from the authoritative data portion combined with revised semantic labels generated based on the current data in the lower resolution.

10. The computing system of claim 8, wherein the data points in the high resolution from the authoritative data portion make up a point cloud from a LIDAR system on a special purpose mapping vehicle, and the current data is a lower resolution point cloud from the at least one sensor located in the physical environment.

11. The computing system of claim 7, wherein the instructions are further effective to cause the computing system to:
store the current data and associate it with an identifier; and
tag the revised authoritative data portion with the identifier of the current data,
whereby a source of the revisions is indicated by the identifier of the current data.

12. The computing system of claim 7, wherein the authoritative data portion and revised authoritative portion file pertains to a map portion defined by a boundary of location coordinates, wherein the authoritative data file is an earlier version of the map portion, and the revised authoritative data portion is a later, revised version of the map portion.

13. The computing system of claim 12, wherein the instructions are effective to cause the at least one computing system to:
publish a restriction on use of the map portion upon the receipt of the data indicating the inconsistency between all stored data and the current data;
publish the revised authoritative data portion which is the revised version of the map portion; and
remove the restriction on the use of the map portion after the revised authoritative data portion has been published.

14. The computing system of claim 7, wherein the feature of a physical environment pertains to a location of a traffic lane line, and the inconsistency between the feature represented in the authoritative data portion and the feature represented in current data pertains to the location of the traffic lane line.

15. At least one non-transitory computer readable medium comprising instructions stored thereon, wherein the instructions are effective to cause an autonomous vehicle to:
determine that data captured by at least one sensor of the autonomous vehicle represents a feature of a physical environment surrounding the autonomous vehicle differently than the feature of the physical environment is represented in a stored, authoritative map data portion, wherein the authoritative map data portion includes data from a high-resolution sensor system and semantic labels of objects represented by the data from the high-resolution sensor system;
accumulate data from the at least one sensor as the autonomous vehicle passes through a geographic area defined by location coordinates, wherein the accumulated data from the at least one sensor is of lower resolution than the data from the high-resolution sensor system;

automatically check for an availability of pre-existing updates to one or more semantic labels associated with the stored authoritative map data portion;

send the accumulated data from the at least one sensor to a map update service, whereby the authoritative map data portion can be updated based on the accumulated captured data from the at least one sensor if no pre-existing updates to the semantic labels are available.

16. The at least one non-transitory computer readable medium of claim 15, wherein the instructions are effective to further cause the autonomous vehicle to:

receive an updated authoritative map data portion from the map update service, the updated authoritative map data portion includes the data from the high-resolution sensor system combined with revised semantic labels, the revised semantic labels having been generated based on the accumulated data from the at least one sensor.

17. The at least one non-transitory computer readable medium of claim 16, wherein the instructions are effective further cause the autonomous vehicle to:

pilot itself through the geographic area defined by the location coordinates using the updated authoritative map data portion by comparing data collected from the at least one sensor to the revised semantic label in the authoritative map data portion.

18. The at least one non-transitory computer readable medium of claim 16, wherein the accumulated data is sent over a cellular data connection.

19. The at least one non-transitory computer readable medium of claim 17, wherein the instructions are effective to further cause the autonomous vehicle to:

determine that the data captured by at least one sensor of the autonomous vehicle represents the feature of the physical environment surrounding the autonomous vehicle differently than the feature of the physical environment is represented in the data from the high-resolution sensor system in the revised authoritative map data portion;

determine that the revised authoritative map data portion includes the revised semantic labels; and determine that no further update is needed to the revised authoritative map data portion because the feature of the physical environment represented by the data captured by at least one sensor of the autonomous vehicle is reflected by the revised semantic labels.

20. The at least one non-transitory computer readable medium of claim 15, wherein the data captured by the at least one sensor of the autonomous vehicle represents the absence of the feature in represented in the stored, authoritative map data portion.

* * * * *